United States Patent [19]
Shimoura et al.

[11] 3,867,870
[45] Feb. 25, 1975

[54] CONTROL VALVE REACTION DEVICE FOR A POWER STEERING SYSTEM

[75] Inventors: Yoshiyuki Shimoura, Matsuyama; Hideo Konishi, Yorii-machi; Hirotetsu Sonoda, Matsuyama, all of Japan

[73] Assignee: Jidosha Kiki Co., Ltd., Tokyo, Japan

[22] Filed: July 25, 1973

[21] Appl. No.: 382,298

[30] Foreign Application Priority Data
July 31, 1972   Japan.................................. 47-75857

[52] U.S. Cl................................... 91/372, 91/375 A
[51] Int. Cl................................... F15b 9/10
[58] Field of Search......... 91/375 A, 370, 371, 372, 91/373

[56] References Cited
UNITED STATES PATENTS

| | | | |
|---|---|---|---|
| 3,094,010 | 6/1963 | Folkerts | 91/370 |
| 3,099,167 | 7/1963 | Folkerts | 91/372 |
| 3,433,127 | 3/1969 | Thompson | 91/372 |

*Primary Examiner*—Paul E. Maslousky
*Attorney, Agent, or Firm*—Larson, Taylor & Hinds

[57] ABSTRACT

A control valve reaction device for a power steering system, which comprises a plurality of reaction plungers inserted slidably in a sleeve valve member connected to a threaded shaft member of two shaft members, the axes of the plungers being displaced at a right angle from the shaft member, and in which an end of said reaction plunger acts on a seat surface of a rotor valve member formed in the steering shaft member and a fluid pressure passing to a pressure motor caused from operation of a control valve by relative rotation of said two shaft members acts on an end surface of said reaction plunger, and thrust force of said reaction plunger produced therefrom is imparted to the rotor valve member to generate a rotational force resistant to the relative rotation of said two shaft members.

4 Claims, 3 Drawing Figures

CONTROL VALVE REACTION DEVICE FOR A POWER STEERING SYSTEM

This invention relates to a control valve reaction device for a power steering system.

Generally in a conventional servo control valve for a power steering system, particularly in a valve of the rotary type in which valve members make a relative rotary movement, a valve sensitivity is extremely high so that an operator cannot always sense a magnitude of resistance opposing a steering movement or effective servo force although is possible a light steering movement so that the operator tends to be uneasy during a steering operation.

An object of the invention is to overcome above disadvantages and to provide a control valve reaction device for a power steering system by which an operator can always sense a magnitude of resistance in opposition to a steering movement or an effective servo force in a fluid servo mechanism controlling a fluid pressure motor of the power steering system.

According to the invention, there is provided a control valve reaction device for a power steering system, which comprises a plurality of reaction plungers inserted slidably in a sleeve valve member connected to a threaded shaft member of two shaft members, the axes of the plungers being displaced at a right angle and offset from the shaft member, and in which ends of said reaction plungers act on seat surfaces of a rotor valve member formed in the steering shaft member and a fluid pressure passing to a fluid pressure motor caused from operation of a control valve by relative rotation of said two shaft members acts on end surfaces of said reaction plungers, and thrust force of said reaction plungers produced therefrom is imparted to the rotor valve member to generate a rotational force resistant to the relative rotation of said two shaft members so that a steering sense in the steering movement is obtained.

In order that this invention may be more clearly understood, reference will now be made, by way of example, to the accompanying drawings in which.

Figure 1:
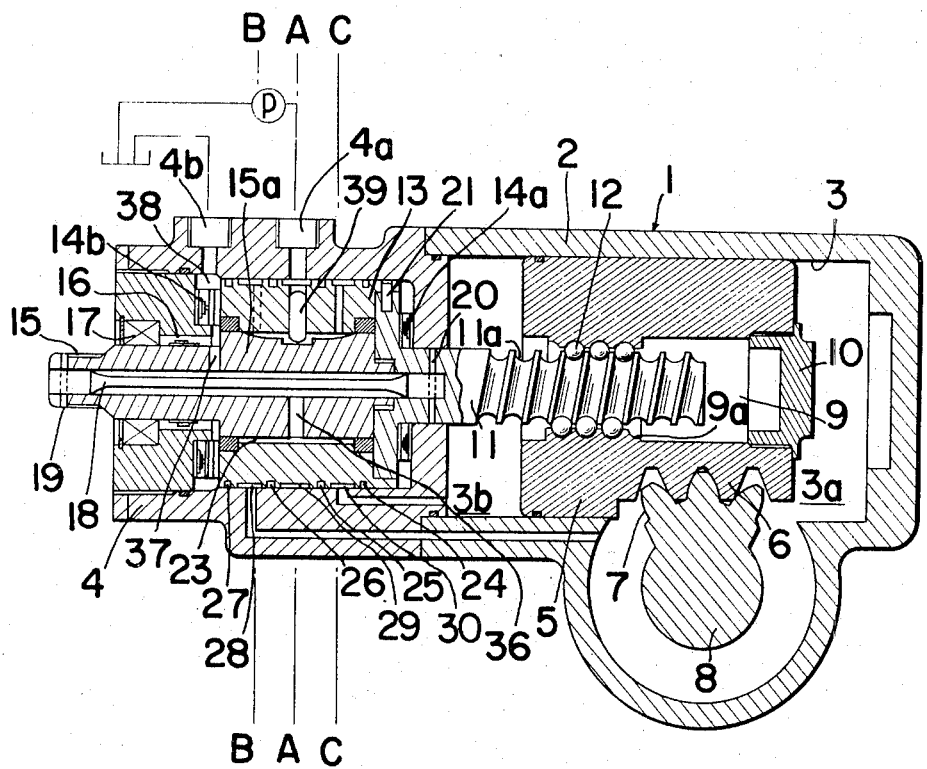
FIG. 1 is a device according to the present invention in a sectional view taken along the line D—D of FIG. 2.

In FIG. 1, a power steering device 1 comprises a casing 2, in which a cylinder 3 of a fluid pressure motor is formed.

At an end of the cylinder 3 is provided a housing 4 for a control valve, the housing fixed to the casing 2 by bolt or the like. The other end of the cylinder 3 is closed, in which is fitted a piston 5 slidable in the axial direction and forming a right cylinder chamber 3a and a left cylinder chamber 3b in the cylinder 3. In a part of the piston 5 is provided a rack 6 engageable with a sector gear 7 provided at an end of a gear wheel shaft 8. The other end of the gear wheel shaft 8 is connected to a steering wheel through a link mechanism including a pitman arm, a drag ling, a knuckle arm etc. not shown, said steering wheel being transmitted a steering torque.

In the middle of the piston 5 is bored a through hole 9 which has a spiral groove 9a in a semicircular shape one end of which is sealed with a plug 10. The spiral groove 9a of the piston 5 is screw engaged with a threaded shaft member 11 having a spiral groove 11a, by means of balls 12 and one end of the shaft member is supported in the housing 4 to permit a sleeve valve member 13 to rotate between thrust bearings 14a and 14b.

On the same axis as that of the threaded shaft member 11, ther is a steering shaft member 15 supported in a bearing 16 and sealed by an oil seal 17 at the end of the housing 4.

The steering shaft member 15 has an end projecting out of the housing 4, and is connected to a handle shaft and a steering handle through a joint and the like not shown. The operator can rotate it during the steering operation.

The steering shaft member 15 and the threaded shaft member 11 are connected by a connecting member 18 such as a flexible torsion spring so as to be relatively rotatable, and are respectively secured to the connecting member pins 19, 20.

Inside the housing 4 is rotatably provided a sleeve valve member 13 which is connected to the end of the threaded shaft member 11 by a pin 21.

As shown in FIGS., 1 and 3, there are provided six grooves 22 and 23 at equal intervals and axially extending along the inner periphery of the sleeve valve member 13. At the outer periphery of the sleeve valve member 13 are provided four annular seals 24, 25, 26 and 27 and three annular grooves 28, 29 and 30. Six grooves 31 and 32 are provided with equal spaces and axially extending along the outer periphery of the rotor valve member 15a formed in the steering shaft member 15. The passage 33 radially extending and provided in the sleeve valve member 13 has the rotor groove 32 connected to the annular groove 28 communicating with the right cylinder chamber 3a. The radially extended passage 34 connects the sleeve groove 22 to the annular groove 29. A radially extended passage 35 has the rotor groove 31 connected to the annular groove 30 communicating with the left cylinder chamber 3b. The sleeve groove 23 is connected to a return chamber 38 provided at an end of the sleeve valve member 13 through the radially extending passages 36 and 37 of the rotor valve member 15a.

Figure 2:
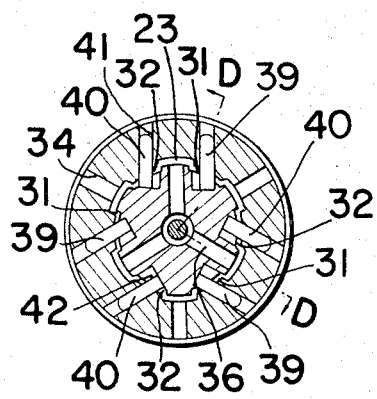
FIG. 2 is a sleeve valve member and a rotor valve member in a transverse cross section taken along the line A—A of FIG. 1.

Referring to FIG. 2, there are provided three reaction plungers 39 facing the rotor grooves 31 in the groove 29 of the sleeve valve member 13 and three reaction plangers 40 directed to the rotor grooves 32, respectively having axes of the reaction plungers 39, 40 properly displaced from the axis of the rotor valve member 15a and provided slidably and axially in the holes 41, these elements contacting seat surfaces 42 of flat bottomed recesses respectively provided in the grooves 31 and 32 of the rotor valve member 15a.

The power steering device of the above construction works as follows.

Figure 3:
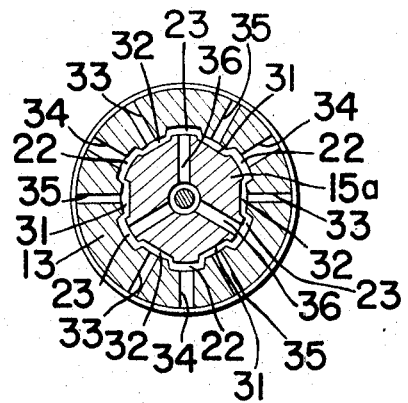
FIG. 3 is cross sections in a combined form where fluid passages in cross sections taken along the lines A—A, B—B, and C—C are shown in a same plane in order to clarify movements of fluid in a control valve.

As shown in FIGS. 1 and 3, when the sleeve valve member 13 is in a neutral position relative to the rotor valve member 15a, the pressure fluid passes from the inlet 4a, through the annular groove 29, the radially extended sleeve passages 34, the axially extended sleeve grooves 22, through the rotor grooves 31 and 32, the sleeve grooves 23, the rotor radial passages 36 and 37, and the return chamber 38 and finally to outlet 4b.

Subsequently, when the steering handle is rotated, its rotation causes the steering shaft member 15 to rotate and the connecting member 18 connecting the rotor valve member 15a and the threaded shaft member 11 to deflect so as to rotate the rotor valve member 15a relative to the sleeve valve member 13. Consequently, a fluid entering from the inlet 4a is conducted from the annular groove 29 and the radially extended passages 34 to the sleeve grooves 22 and through the rotor grooves 31 or 32 to the cylinder chamber 3a or 3b to thereby operate the piston 5. In case when, as shown in FIG. 3, the rotor valve member 15a is rotated rightwards, the fluid flowing from the passages 34 to the sleeve grooves 22 is conducted from the rotor grooves 31 to the radial passages 35. Between the sleeve grooves 22 and the rotor grooves 32 and between the rotor grooves 31 and the sleeve grooves 23, the passage is throttled to raise the fluid pressure in the sleeve grooves 22 and rotor grooves 31. The fluid is conducted from the radial passage 35 to the left cylinder chamber 3b so that the fluid pressure acting on the piston 5 will rise. The steering torque generated in the gear shaft 8 is proportioned to the fluid pressure acting on the piston 5. At the same time, this fluid pressure will act on the end surfaces facing the annular groove 29 of the reaction plungers 39 and on the end surfaces directed to the rotor grooves 31, but since the rotor grooves 32 pass through the sleeve grooves 23 and the return chamber 38 to a tank, the fluid pressure may not act on the end surfaces of the reaction plungers 40 directed to the rotor grooves 32. As a result, thrust forces may be produced in the reaction plungers 40 in the direction of rotation of the rotor valve member 15a to the left. The fluid pressure is transmitted to the operator through the rotor valve member 15a, the steering shaft member 15, the handle shaft and handle.

The thrust force of the reaction plungers is same as the fluid pressure acting on the piston 5 so that it will act as a resistance to the steering movement and thereby a better steering feeling is achieved. As the same fluid pressure acts on both end surfaces of the reaction plungers 39, there is not produced any thrust force nor any influence exerted on the rotor valve member 15a. When the handle is rotated leftwardly, a thrust force is produced in the reaction plungers 39 in the same way as described above so as to provide a good steering feeling to the operator.

The above embodiment is a case when the reaction plunger has its end directed to the annular groove 29 but the plungers may of course be arranged to be directed to the annular groove 28 or 30.

Many variations may be effected without departing from the spirit of the invention. It is to be understood that these, together with other variations in details, are anticipated by the appended claims.

What we claim is:

1. In a power steering system having a control valve reaction device, the combination comprising: a fluid pressure motor having a piston and a cylinder slidably fitted with said piston for assisting manual steering torque; steering handle shaft means for transmitting a steering torque applied to a steering handle, and comprising a threaded shaft member threadly coupled with the piston of said fluid pressure motor and a steering shaft member; a flexible connecting member connecting relatively rotatably said two shaft members; a control valve comprising a sleeve valve member connected to said threaded shaft member and a rotor valve member formed in said steering shaft member and operating said fluid pressure motor by relative rotary movement of said two shaft members; an annular groove formed in the periphery of said sleeve valve member and connected to an inlet for pressure fluid at the periphery of said sleeve valve member; a plurality of reaction plungers slidably mounted in said sleeve valve member in a common plane with said annular groove such that one end of each plunger is exposed directly to fluid pressure in said annular groove; said rotary valve member having two rotor grooves in fluid communication with said cylinder on respectively opposite sides of said piston such that one or the other of said sides can be fluid pressurized by relative rotary movement of said rotary valve member and sleeve valve member; different ones of said reaction plungers bearing at their other ends against said rotary valve member in respective ones of said rotor grooves so as to be exposed to the pressures in the respective grooves, whereby the one ends of said reaction plungers are exposed to pressurized inlet fluid and the other ends will be exposed to the pressure prevailing in their respective rotor grooves, and the net thrust force of said reaction plungers will be applied against said rotor valve member to oppose relative rotary movement of said two shaft members.

2. Apparatus according to claim 1 wherein different ones of said reaction plungers inserted in the sleeve valve member inside said annular groove are offset oppositely from the axis of the rotor valve member and oriented so as to bias said rotor valve member in opposite directions.

3. Apparatus according to claim 1 wherein half of the reaction plungers inserted slidably in the sleeve valve member bear against seat surfaces formed in the rotor groove connected to one side of the cylinder of the fluid pressure motor and the remaining half bear against seat surfaces formed in the rotor groove connected to the other side of the cylinder.

4. Apparatus as claimed in claim 1 wherein said reaction plungers are engaged in plunger holes opening into the annular groove of said sleeve valve, and extend therethrough to bear against said rotor valve member.

* * * * *